United States Patent [19]

Prasad et al.

[11] Patent Number: 5,497,792
[45] Date of Patent: Mar. 12, 1996

[54] PROCESS AND APPARATUS FOR THE SEMICONTINUOUS EXTRACTION OF NICOTINE FROM TABACCO

[75] Inventors: Ravi Prasad, Midlothian; Harvey J. Grubbs, Mechanicsville, both of Va.

[73] Assignee: Philip Morris Incorporated, New York, N.Y.

[21] Appl. No.: 122,760

[22] Filed: Nov. 19, 1987

[51] Int. Cl.⁶ .................................................. A24B 15/24
[52] U.S. Cl. ........................................... 131/297; 131/298
[58] Field of Search ..................................... 131/297, 298

[56] References Cited

U.S. PATENT DOCUMENTS

| | | | |
|---|---|---|---|
| 802,487 | 10/1905 | Wimmer | 131/298 |
| 1,196,184 | 8/1916 | Villiers-Stuart . | |
| 1,294,310 | 2/1919 | Sayre et al. . | |
| 2,162,738 | 6/1939 | McCoy | 260/91 |
| 3,046,997 | 7/1962 | Hind | 131/143 |
| 3,110,315 | 11/1963 | Lendvai | 131/10 |
| 3,139,435 | 6/1964 | Staley et al. | 260/291 |
| 3,390,685 | 7/1968 | von Bethmann et al. | 11/143 |
| 3,396,735 | 8/1968 | von Bethmann et al. | 131/143 |
| 3,612,066 | 10/1971 | Jones et al. | 131/143 |
| 4,153,063 | 5/1979 | Roselius et al. | 131/143 |
| 4,215,706 | 8/1980 | Larson et al. | 131/143 |
| 4,411,923 | 10/1983 | Hubert et al. | 426/271 |
| 4,448,208 | 5/1984 | Friedrich et al. | 131/297 |
| 4,548,755 | 10/1985 | Stahl et al. | 260/412.8 |
| 4,554,163 | 11/1985 | Weber | 424/195.1 |
| 4,561,452 | 12/1985 | Gahrs | 131/297 |
| 4,727,889 | 3/1988 | Nivens et al. | 131/197 |

FOREIGN PATENT DOCUMENTS

| | | |
|---|---|---|
| 1130988 | 7/1982 | Canada . |
| 001136 | 5/1980 | European Pat. Off. . |
| 0088405 | 9/1983 | European Pat. Off. . |
| 0141097 | 5/1985 | European Pat. Off. . |
| 397021 | 2/1909 | France . |
| 2106252 | 4/1972 | France . |
| 3716689 | 1/1988 | Germany . |
| 82835 | 2/1987 | Luxembourg . |
| 0028536 | of 1908 | United Kingdom ................... 131/297 |

OTHER PUBLICATIONS

P. Hubert & O. G. Vitzhthum, "Fluid Extraction of Hops, Spices, and Tobacco with Supercritical Gases", *Angewandte Chemie*, Int. Ed. Engl. 17, pp. 710–715 (1978).

D. F. Williams, "Extraction With Superficial Gases", Review Article No. 5, *Chemical Engineering Science* 36 pp. 1769–1788, 1781 (1981).

L. N. Luganskaja, E. B. Krasnokutskaj and L. B. Jasinskaja, "The Use Of Tobacco Dust Extract For Aromatizing Purposes", *Tabak, SSSR* 1, pp. 30–33 (1967) (translation enclosed).

*Primary Examiner*—Jennifer Bahr

[57] ABSTRACT

A process is provided for the improved removal of nicotine from tobacco. An essentially nicotine-free solvent in the supercritical or liquid state is fed into a first end of an extraction flow system containing tobacco and a nicotine-rich solvent is discharged from a second end of the extraction flow system. Periodically a portion of extracted tobacco is discharged from the first end of the extraction system while simultaneously a portion of an unextracted tobacco is charged to the second end of the extraction system. Nicotine is then entrapped in an entrapment material or otherwise removed from the solvent and solvent is recycled through the extraction flow system. Various materials are provided as entrapment materials. Among the entrapment materials provided are aqueous solutions containing absorbent selected from various acids and salts. Among the acids and salts provided as entrapment materials are sulfuric acid, phosphoric acid, nitric acid, tartaric acid, citric acid, malic acid, lactic acid, malonic acid, succinic acid, acetic acid, glutamic acid and monopotassium citrate.

73 Claims, 1 Drawing Sheet

PROCESS AND APPARATUS FOR THE SEMICONTINUOUS EXTRACTION OF NICOTINE FROM TABACCO

FIELD OF THE INVENTION

This invention relates to extraction procedures and is particularly directed to a process for the semicontinuous extraction of materials from plant products. The invention may be used for the selective extraction of particular substances from a great variety of plant products, including caffeine and other xanthine derivatives from coffee beans and cacao and tea plant materials and products. However, it is particularly applicable and will therefore be described in connection with the extraction of nicotine from tobacco.

BACKGROUND OF THE INVENTION

Various processes have been proposed for the removal of nicotine from tobacco. Most of these processes, however, adversely affect the desirable flavor and aroma properties of the tobacco. Also, they are often complex and expensive to carry out.

U.S. Pat. No. 4,153,063 (Roselius) discloses a process for removing nicotine from tobacco in which tobacco is contacted with an extraction solvent in a supercritical state. It discloses both a single step extraction process and a multi-step extraction process. In the single step extraction process, moist tobacco is extracted with a solvent in a supercritical state. Because aroma components are also removed along with nicotine in this single step extraction process, the multi-step process is preferred. In the first step, dry tobacco is extracted with a solvent in the supercritical state to remove the aroma components. In the second step, the tobacco is moistened and again extracted with a solvent in the supercritical state to remove nicotine. The nicotine is separated from the solvent by either evaporating the solvent, contacting the solvent in a separate vessel with an acid, or adsorbing the nicotine on an active carbon column. In the third step, the stored aroma components from the first step are redissolved in a supercritical solvent and returned to the tobacco. This multi-step extraction process is expensive and time consuming. In addition, the prolonged handling of the aroma components may adversely affect their properties.

SUMMARY OF THE INVENTION

This invention provides an improved process for removing nicotine from tobacco. An essentially nicotine-free solvent in the supercritical or liquid state is fed into a first end of an extraction system containing tobacco and a nicotine-rich solvent is discharged from a second end of the extraction system. Periodically a portion of extracted tobacco is discharged from the first end of the extraction flow system while a portion of unextracted tobacco is charged into the second end of the extraction flow system.

A given solvent generally has a capacity to dissolve solute which is proportional to the concentration of solute in available extraction material. When fresh solvent is first exposed to extraction material, the solvent has a large capacity for solute and can remove solute which is present at low concentrations. When solvent which is at equilibrium at a given solute concentration is exposed to extraction material with a relatively greater solute concentration the solvent can dissolve still more solute. By using partially extracted extraction material at the first end of the extraction flow system where solute levels are generally low, the amount of solute remaining in extraction material can be reduced still further. By introducing fresh extraction material at the second end of the extraction system, the solvent can still remove solute from the extraction material while at the same time increasing the solute concentration in solvent leaving the second end of the extraction flow system.

This invention also provides an improved process for removing nicotine from an extraction solvent. A nicotine-containing solvent in the supercritical or liquid state is fed into the first end of an entrapment system containing one or more vessels, each vessel containing nicotine entrapment material while an essentially nicotine-free solvent is withdrawn from the second end of the entrapment system. Periodically a portion of spent entrapment material is discharged from the first end of the entrapment system while a portion of fresh entrapment material is charged into the second end of the entrapment system.

Entrapment material generally has a given capacity to entrap solute which, if below the saturation concentration, is proportional to the concentration of solute in delivered solvent. When entrapment material is first exposed to solute, the material has a large capacity for solute and can remove solute which is present at low concentrations. When entrapment material reaches equilibrium at a given solute concentration, if the solute concentration is then increased, the entrapment material can entrap still more solute. By introducing fresh entrapment material at the second end of the extraction flow system where solute levels are generally low, the solute level can be reduced still further. By using partially saturated entrapment material at the first end of the extraction flow system, the entrapment material can entrap additional solute while at the same time lowering the solute concentration in solvent passed to the second end of the extraction flow system.

Persons skilled in the art will recognize that condensation or distillation techniques can also be used to remove nicotine from the solvent and are thus within the scope of this invention.

In one embodiment of this invention, a plurality of tobacco extraction vessels is connected in series as part of a flow system. These extraction vessels are in turn connected either to one entrapment vessel or to a plurality of entrapment vessels which are also connected in series as part of a flow system. Tobacco is extracted with a solvent either in the supercritical state or in the liquid state by continuously passing the essentially nicotine-free solvent through one end of the plurality of extraction vessels connected in series and discharging the nicotine-enriched solvent from the opposite end. Thereafter the solvent, enriched in nicotine, is passed through an entrapment vessel or a plurality of entrapment vessels, connected in series, to remove the nicotine. The solvent, depleted in nicotine, is then recycled to the extraction vessel or vessels to again extract nicotine. Removal and addition of an extraction vessel from the flow system, or removal and addition of an entrapment vessel from the flow system, to provide continuous extraction or entrapment, respectively, is accomplished by valve adjustment.

It is an object of this invention to provide a process for extracting nicotine from tobacco which is more efficient than earlier processes, provides a faster cycle time and results in lower capital and operating costs.

It is another object of this invention to provide a process for extracting nicotine from tobacco which increases the concentration of nicotine in the solvent and decreases the amount of solvent required per unit of tobacco.

It is still another object of this invention to provide a process for extracting nicotine from tobacco which requires less extraction solvent and thereby results in less degradation and loss of the aroma producing components and consequently gives an improved tobacco product.

It is another object of this invention to provide a process for extracting nicotine from tobacco which increases the amount of nicotine loaded on the nicotine entrapment material and significantly decreases the ratio of entrapment material to tobacco.

It is a further object of this invention to provide a process for extracting nicotine from tobacco which results in a reduced $CO_2$ pressure drop, reduced tobacco bed compaction and a more favorable extraction bed geometry.

These and other objects and advantages of the invention may be seen in the following description.

DETAILED DESCRIPTION OF THE INVENTION

Figure 1:
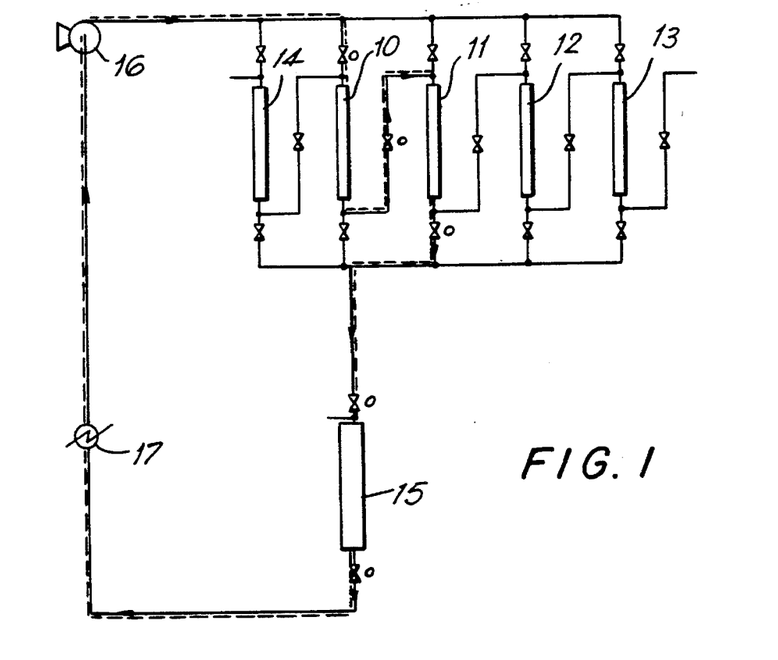
FIG. 1 illustrates an apparatus for the semi-continuous extraction of nicotine from tobacco and batch entrapment of nicotine from the solvent.

An apparatus for the semi-continuous extraction of nicotine from tobacco is shown in FIG. 1. Extraction vessels 10 through 14 can contain tobacco and can be connected in series as part of a flow system by valve adjustment. The vessels 10 and 11 as depicted are on stream and are connected to entrapment vessel 15. Persons skilled in the art will recognize that the pump can be placed on any of several lines in the system.

The extraction vessels illustrated in FIG. 1 are depicted as being connected in series. One skilled in the art will recognize that many other configurations are possible and are included within the scope of this invention. For example, additional or fewer vessels can be used. Additional lines could be added so that the exits of each or some vessels are multiply connected to the inputs of more than one other vessel so that the order of the vessels in the flow system could be altered as desired by changing valve settings. This would allow selected vessels to be isolated from the system completely for repairs or testing. In addition, any of the serially-connected vessels can be replaced by multiple vessels connected in parallel and still be equivalent to the arrangement illustrated.

The extraction vessels are preferably all designed for radial flow or all for axial flow of solvent. The entrapment vessel can be designed for radial flow or axial flow. A radial flow of solvent will minimize compaction of solid material in a vessel and may allow for lower pressure drops within each vessel. Persons skilled in the art will recognize that many directions of flow will be effective, e.g., flow from bottom to top or top to bottom or inward or outward radially in each vessel.

In a preferred form of the invention, an extraction solvent is circulated through pump 16 to extraction vessel 10. The pressure in the vessel is controlled by means of a fill pump (not shown) and the temperature is controlled by means of heat exchanger 17. The extraction solvent enters the top of extraction vessel 10, passes downwardly through the tobacco bed and leaves at the bottom of the vessel. In passing through the tobacco bed, the extraction solvent becomes enriched with nicotine from the tobacco. The solvent is then circulated to extraction vessel 11, again being introduced from the top, and then passing downwardly and exiting at the bottom. The concentration of extracted nicotine in the solvent and the concentration of unextracted nicotine in the tobacco will attain an equilibrium. If the concentration of unextracted nicotine in tobacco in vessel 11 is greater than the concentration of nicotine in the solvent entering vessel 11, then the solvent becomes further enriched with nicotine. After exiting extraction vessel 11, the solvent is circulated to entrapment vessel 15. The extraction solvent enters the top of the vessel and then passes downwardly exiting at the bottom. In passing through the vessel, the nicotine in the solvent becomes trapped on or in the entrapment material. The solvent, essentially depleted of nicotine, is then returned into the cycle by recirculating it to extraction vessel 10.

Extraction vessels 12, 13 and 14 are off stream and are in the turn-around cycle. In the turn-around cycle, extraction solvent is vented from the extraction vessel (exhaust lines not shown), the extracted tobacco is unloaded, unextracted tobacco is loaded into the extraction vessel, and the extraction vessel is refilled with extraction solvent (fill lines are not shown). Extraction vessels containing extracted tobacco are removed periodically from the end of the extraction flow system into which essentially nicotine-free solvent is fed while simultaneously extraction vessels containing unextracted tobacco are added at the end of the extraction flow system from which nicotine-enriched solvent is discharged. Removal and addition of extraction vessels from or to the flow system is accomplished by valve adjustment.

Figure 2:
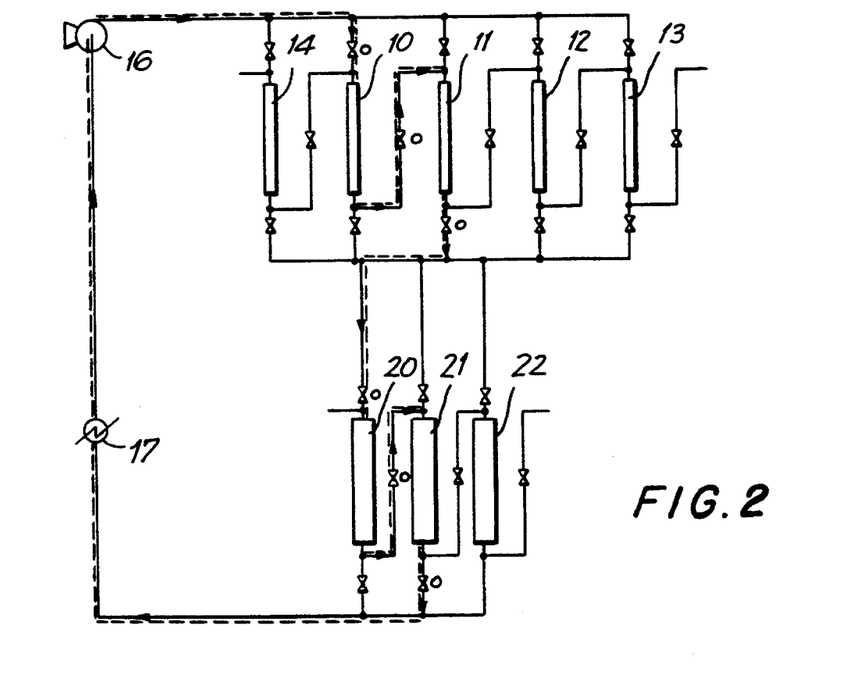
FIG. 2 illustrates an apparatus for the semi-continuous extraction of nicotine from tobacco and the semi-continuous entrapment of nicotine from the solvent.

FIG. 2 illustrates an alternative preferred embodiment wherein a plurality of extraction vessels, connected in series, is connected to a plurality of entrapment vessels, also connected in series. One skilled in the art will recognize that other configurations or arrangements of entrapment or extraction vessels are possible, as discussed above for extraction vessels. Extraction vessels 10 and 11 contain tobacco and are connected in series and are on stream. Extraction vessels 12, 13 and 14 are off stream and in the turn-around cycle. Entrapment vessels 20 and 21 are connected in series and are on stream. Entrapment vessel 22 is off stream and in the turn-around cycle.

The extraction vessels are preferably all designed for radial flow or all for axial flow of solvent, as discussed above. The entrapment vessels are also preferrably all designed for radial flow or axial flow but need not be of the same design as the extraction vessels. A radial flow of solvent will minimize compaction of solid material in a vessel and may allow for lower pressure drops within each vessel. Persons skilled in the art will recognize that many directions of flow will be effective, e.g., flow from bottom to top or top to bottom or inward or outward radially in each vessel.

As described for FIG. 1, extraction solvent is supplied to extraction vessel 10 and then circulated to extraction vessel 11. After exiting extraction vessel 11, the solvent is circulated to entrapment vessel 20. The extraction solvent enters the top of the vessel and passes downwardly, exiting at the bottom. The solvent is then circulated to entrapment vessel 21 again being introduced from the top, and passing downwardly, exiting at the bottom. In passing through the vessels 20 and 21, the nicotine in the solvent becomes trapped on or in the entrapment material. The solvent, essentially depleted of nicotine, is then returned into the cycle by recirculating it to extraction vessel 10.

Entrapment vessel 22 is off stream and in the turn-around cycle. In the turn-around cycle, extraction solvent is vented from the entrapment vessel, the spent entrapment material unloaded, fresh entrapment material is loaded into the vessel and the vessel is refilled with extraction solvent. Entrapment vessels containing spent entrapment material are removed periodically from the end of the entrapment flow system into which nicotine-enriched solvent is fed while simultaneously entrapment vessels containing fresh entrapment material are added at the end from which nicotine-lean solvent is discharged. Removal and addition of entrapment vessels from or to the flow system is accomplished by valve adjustment.

In yet another embodiment of this invention, a plurality of entrapment vessels connected in series may be used to remove nicotine from a solvent in a process utilizing a single extraction vessel rather than a plurality of extraction vessels connected in series.

A number of extraction solvents having solvent capacity for nicotine in both their liquid and gaseous phases can be employed to reduce the nicotine content of tobacco. Carbon dioxide in the supercritical state is the preferred solvent in this invention. Other solvents useful in practicing this invention include, for example, halogenated hydrocarbons including up to about 4 carbon atoms such as $CF_4$, $CHF_3CClF_3$, $CBrF_3$, $CF_2=CH_2$, $CF_3-CF_2CF_3$, $CHClF_2$, $CCl_2F_2$, $CHCl_2F$, $CCl_3F$, $CBrF_3$, $CFCl=CF_2$, $CH_3-CF_3$, octafluorocyclobutane and hydrocarbons including up to about 5 carbon atoms such as propane, butane, pentane; other useful solvents include $N_2O$, $SF_6$ and argon. Mixtures of solvents or additives or co-solvents may be used to obtain improved solvent characteristics.

A solvent in the supercritical state is a solvent in the gas phase at a sufficiently high temperature so that it cannot be liquefied by an increase in pressure. A solvent in the subcritical state is a solvent in the gas phase which can be liquefied by an increase in pressure.

Supercritical carbon dioxide is carbon dioxide which is above its critical temperature, i.e., above about 31.3° C. and above its critical pressure, i.e., above about 70 atmospheres. Extraction with carbon dioxide in the supercritical state is carried out at a pressure in the range of from about 70 to about 1500 atmospheres and at a temperature in the range of from above about the critical temperature to about 120° C. The range of temperature and pressure for the supercritical state of other useful solvents are of generally the same order of magnitude.

The entrapment material in the entrapment vessel may be an adsorbent or absorbent with an affinity for nicotine. Adsorbents useful in practicing this invention include activated carbon, silica, alumina, magnesium silicate and ion exchange resins. The adsorbent may also be mixed with a diatomaceous earth, up to a ratio of about 1:1, to improve the flow rate of the adsorbent. Other useful absorbents include tobacco or tobacco stems, tobacco plant products which have been treated with an acid, and other absorbents such as cocoa shells. One particularly useful absorbent is tobacco stems which have been sprayed with or soaked in an aqueous solution of a polycarboxylic acid or salts thereof, such as monopotassium citrate.

Alternatively, the entrapment material in the entrapment vessel may be an absorbent which has an affinity for nicotine. Absorbents are preferred over adsorbents. Such absorbents include water, acid, aqueous acid solutions and aqueous salt solutions.

The preferred acids for use as an entrapment material in this invention are non-volatile and non-soluble in the solvent under the conditions of the extraction. Acids useful in practicing this invention include sulfuric, phosphoric and nitric acids. Other useful acids include polycarboxylic acids such as tartaric, citric, malic, lactic, malonic, succinic, acetic and glutamic acids.

Monovalent salts such as the alkali salts of the above acids are generally preferred because these salts are less volatile and less soluble in the solvent. A preferred salt of an acid is monopotassium citrate. Monoammonium and diammonium salts of the above acids may also be used. Polyvalent salts of the above acids are also useful but are less efficient in trapping nicotine.

The extraction process may be carried out on tobacco which has or has not been premoistened. It is generally preferred to moisten the tobacco, if necessary, to up to about 25% OV (oven volatiles). The percentage of oven volatiles (% OV) in the tobacco is a measure of the moisture content plus a minor fraction of other components and is determined as follows:

$$\% \, OV = \frac{\text{weight loss of sample after 3 hrs. at 100° C.}}{\text{sample weight}}$$

The size of the vessels required in a semi-continuous system is smaller than in a batch system resulting in reduced turn-around time. The number of vessels can be lower as well. In addition, the number of $CO_2$ circulation pumps, the size of the $CO_2$ storage vessels and the size of the $CO_2$ handling system (fill pump, compressor) are smaller. Only one heat exchanger, one recovery cooler-condensor and one dust filter are needed. The average nicotine concentration in the supercritical $CO_2$ is higher, which results in a lower value for the ratio of the amount of $CO_2$ to tobacco and a lower value for the amount of entrapment material to tobacco ratio. In addition, because the system runs semi-continuously, equipment reliability is better and adaptability of the system to a liquid wash process is improved.

It is preferable to use a relatively larger number of smaller vessels per mass of extraction or entrapment material when practicing this invention. The figures presented illustrate the use of a series of two extraction or entrapment vessels in the flow system at any one time, but three or more vessels in series in the process flow system can be used to achieve relatively more efficient extraction or entrapment but potentially at relatively greater cost of materials and physical plant equipment.

It is preferable that extraction and entrapment vessels be essentially filled with tobacco or entrapment material, although the invention can be practiced with vessels that are less-than-essentially full. The amount of solvent used is preferably at least that amount which allows the system to be operated under supercritical conditions. If liquid solvents are to be used, the amount of solvent used is preferably an amount sufficient to completely wet the tobacco and entrapment material and more preferably enough solvent to essentially fill all of the vessels in the flow system. It is generally preferable to choose a total solvent volume to maximize the concentration of nicotine in solvent leaving the last extraction vessel in the flow system, which is generally the minimum amount of solvent possible. Use of a minimum amount of solvent will generally minimize the extraction of flavor producing components from the tobacco, thereby improving the quality of the extracted tobacco. One skilled in the art of extraction technology will recognize that reasonable variations in these design criteria are possible and are within the scope of this invention.

The choices of solvent flow and vessel dimensions are interrelated. The most fundamental parameter in the process of this invention is "M/M," the total solvent mass passed through the tobacco during the extraction cycle divided by the mass of tobacco extracted. The solvent flow should be sufficient to extract nicotine satisfactorily from tobacco in a reasonable amount of time. Given a target time and final nicotine concentration, one skilled in the art can calculate or determine by simple experimentation what volume of vessel is required. The time of extraction can then be adjusted to achieve the exact amount of nicotine extraction desired. Values of 75:1 to 300:1 for M/M give satisfactory results.

Excessive solvent velocity can cause bed compaction and decrease system performance. Downward flow of solvent through a bed of tobacco can be at velocities of preferably less than about 0.1–2 feet per minute and more preferably 0.5–1 feet per minute. A correspondingly greater vessel diameter can be utilized to decrease the solvent velocity required to achieve a given throughput while a relatively smaller diameter can be utilized to increase the amount of solvent contacting each particle of tobacco per unit time. The height or length of the vessel is preferably about 1 to 5 times and still more preferably 1 to 2 times the diameter of the vessel.

The amount of entrapment material should preferably be that amount sufficient to trap essentially all of the nicotine extracted from the tobacco. A few simple experiments will quickly establish what amount that may be in any particular flow configuration. For example, when a solid entrapment material is used, the entrapment material discharged after an entrapment cycle can be analyzed for the amount of nicotine adsorbed at varying distances from the inlet of the entrapment vessel. Alternatively, one can measure the concentration of nicotine in solvent at the outlet of the entrapment system while extracting repeated batches of nicotine. When the level of nicotine rises significantly, a new equilibrium, at higher nicotine concentrations is established between the solvent and entrapment material. Note that this same entrapment material may still have capacity to remove more nicotine if higher levels of nicotine are delivered to the entrapment vessel from the process stream.

When a vessel containing tobacco is extracted with a flow of solvent, the nicotine concentration at the outlet of the vessel is initially high, and decreases over time at an approximately first order exponential rate. In a batch mode, where a single vessel is extracted until a satisfactory nicotine level is reached, the average concentration of nicotine at the outlet per unit time will be relatively greater during the early phase of the extraction and relatively lower at later times. Where two or more vessels are extracted in series, the concentration per time pattern is the same, but each time a vessel containing fresh tobacco is added to the flow system according to the practice of this invention, the nicotine concentration at the outlet of the last extraction vessel will increase to approximately the initial high value. The low concentrations found late in the batch extraction will not be reached in solvent leaving the last extraction vessel as long as fresh tobacco is repeatedly introduced into the system. The concentration of nicotine at the outlet of the first extraction vessel, however, will drop to a low level, just as in the batch process but in a somewhat shorter time, other conditions being equal. The average concentration of nicotine in the output stream will be higher, on average, than in a batch extraction.

Table 1 shows a comparison of nicotine concentration in supercritical carbon dioxide leaving the extraction flow system during a batch extraction versus a semicontinuous extraction. The amount of nicotine removed from the tobacco is shown, on a dry weight basis (dwb), at time 0, 1 and 2 hours. The overall average nicotine concentration in the carbon dioxide is lower in a batch extraction versus a semi-continuous extraction, 120 v. 214 ppm, respectively. Because the average nicotine concentration is higher, the entrapment process is relatively more efficient and less total $CO_2$ (M/M=84:1 v. 150:1) needs to be circulated through the semi-continuous system to achieve an equivalent removal of nicotine.

TABLE 1

COMPARISON OF
BATCH vs. SEMICONTINUOUS EXTRACTION

| EXTRACTION TIME (hrs) | NICOTINE IN TOBACCO (%) | NICOTINE REMOVED, (dwb) (g/100 g tob.) | | NICOTINE CONC. IN $CO_2$ (ppm) (avg/hr) | |
|---|---|---|---|---|---|
| | | | | BATCH | SEMI-CONTINUOUS |
| 0 | 100 | 0 | | | |
| 1.0 | 13.2 | 1.605 | (86.8%) | 214 | 214 |
| 2.0 | 2.7 | 0.195 | (10.5%) | 26 | 214 |
| | | 1.80 (total) | (97.2%) | 120 (avg) | 214 (avg) |

In a typical semi-continuous extraction and entrapment, as illustrated in FIG. 2, the cycle time for an extraction vessel is 1 hour as the first extraction vessel and 1 hour as the second extraction vessel for a total extraction time for tobacco charged in each extraction vessel of 2 hours. The time available for turn-around of an extraction vessel is 3 hours. Cycle time for an entrapment vessel is 3 hours as the first vessel and 3 hours as the second vessel, thus the total entrapment time for a charge of adsorption or absorption material in each entrapment vessel is 6 hours. The time available for turn-around of an entrapment vessel is 3 hours.

Table 2 shows a comparison of the carbon to tobacco ratio, on a dry weight basis (dwb), in a batch extraction-entrapment, a batch extraction-semicontinuous entrapment and a semicontinuous extraction-entrapment keeping the $CO_2$/tobacco ratio (M/M) constant. The methods of Examples 1 and 2 were used in this study. The carbon to tobacco ratio dropped from 4 in a batch extraction-entrapment to 2 (neglecting the startup cycle) in a semicontinuous entrapment, which represents a decrease of 50% in the carbon required. When semi-continuous extraction is combined with semi-continuous entrapment, the nicotine concentration entering the entrapment vessel is higher, on average, and the entrapment is more efficient, so still less carbon is required. The estimated carbon to tobacco ratio in a semi-continuous extraction and entrapment is significantly below 2.0 (in the range of 0.4 to 0.8) which even when calculated based on 0.8 represents a decrease in the carbon required of 80% when compared with the batch extraction-entrapment and a decrease of 60% when compared with the semi-continuous extraction.

TABLE 2

|  | Carbon/Tobacco Ratio (dwb) |
|---|---|
| Batch Extraction/ Batch Entrapment | 4 |
| Batch Extraction/ Semicontinuous Entrapment | 2 (effective) |
| Semicontinuous Extraction/ Semicontinuous Entrapment | less than 2[1] |

[1]Projected ratio: estimated to be 0.4–0.8 in practice.

Table 3 shows a comparison of design features of a batch extraction and a semi-continuous extraction and entrapment. Full flavor tobacco having a nicotine content of 1.85% (dwb) and an oven volatile content of 25% is extracted with carbon dioxide under supercritical conditions at 260 atmospheres and 70° C. using carbon as the entrapment material. After extraction, the tobacco has a nicotine content of 0.05%, a 97% reduction.

The batch extraction configuration in Table 3 consists of four full scale extraction units, each composed of one extraction vessel and two entrapment vessels in series. The results are equivalent if four batches are run through a single large unit, except that solvent flow must be limited to avoid tobacco bed compaction and an increased time is required to extract the same total volume of tobacco. The semi-continuous extraction-entrapment configuration is essentially that shown in FIG. 2, with vessel volumes chosen to process the same amount of tobacco as in the batch process. The $CO_2$ flow velocity is chosen to be approximately equal in each example, while the M/M required is a result of the configuration of vessels (see Table 1 and discussion supra). In each configuration, 3,634 pounds of tobacco is processed per hour. Nicotine loading on carbon is given in percent nicotine per mass of carbon at the end of the extraction.

TABLE 3

|  | BATCH EXTRACTION/ SEMICONTINUOUS ENTRAPMENT (4 UNITS) | SEMI-CONTINUOUS EXTRACTION/ ENTRAPMENT (4 UNIT EQUIV.) |  |
|---|---|---|---|
| CYCLE TIME | 5 hrs | 1 hr. extraction, 3 hrs. adsorption |  |
| EXTRACTION TIME | 2 hrs | 2 hrs |  |
| TURN-AROUND TIME | 3 hrs | 3 hrs |  |
| $^MCO_2/^MTOB$. RATIO[1] | 150 | 84 |  |
| CARBON/TOB. RATIO | 2 [2] | ≦2 (0.8) [3] |  |
| $CO_2$ FLOW | 0.341 M̄ lbs/hr[4] per unit or 1.364 M̄ lbs/hr total for 4 units | 0.305 M̄ lbs/hr total |  |
| EXTRACTION VESSELS: |  |  |  |
| NO. OF VESSELS | 4 | 5 |  |
| TOTAL TOB. CHARGE, LBS. (dwb) | 18,168 | 18,168 |  |
| PER VESSEL TOB. CHARGE, LBS. (dwb) | 4,542 | 3,634 |  |
| PER VESSEL TOB. VOLUME, FT³ | 458 | 366 |  |
| NOMINAL VESSEL VOLUME, FT³ | 800 | 640 |  |
| ENTRAPMENT VESSELS: |  |  |  |
| NO. OF VESSELS | 8 | 3 |  |
| TOTAL CARBON CHARGE, LBS. | 72,672 | <65,600 | (26,240) |
| PER VESSEL CARBON CHARGE, LBS. | 9,084 | <21,870 | (8,748) |
| PER VESSEL CARBON VOLUME, FT³ | 364 | <875 | (350) |
| NOMINAL VESSEL VOLUME, FT³ | 804 | 1,500 | (617) |
| NICOTINE: |  |  |  |
| LOADING ON CARBON, % | 0.9 | >0.9 | (2.25) |
| LBS. REMOVED/CHARGE | 328 | 65.6 |  |
| $CO_2$ FLOW (M̄ LBS/HR) | 1.364 | .305 |  |
| AVG. NICOTINE CONC. IN $CO_2$ (ppm) | 120 | 214 |  |
| $^MCO_2/^MTOB$. RATIO[1] | 150 | 84 |  |
| TOTAL NO. OF PRESS. VESSELS | 12 | 8 |  |

[1]$^MCO_2/^MTOB$. = mass of $CO_2$/mass of tobacco
[2]Effective ratio
[3]Ratio of 2 is worst case, 0.8 or better expected
[4]M̄ lbs/hr = million pounds per hour The following examples are provided to illustrate application of the teachings of and the advantages of the present invention.

EXAMPLE 1

Batch Extraction/Batch Entrapment

This example illustrates old technology in order to better show the advantages of the present invention.

American blend tobacco, 5.5 Kg dwb was moistened to 25% OV via water spray in a rotary cylinder. The moistened tobacco was loaded into an extractor vessel. 22 Kg of activated carbon was loaded into an entrapment vessel. The system was pressurized with $CO_2$ to 260 bar and 70° C. The flow of $CO_2$ was maintained from the tobacco extraction vessel to the carbon entrapment vessel for 60 minutes. Then, $CO_2$ was vented and tobacco and carbon were unloaded. A profile of nicotine concentration on carbon in the entrapment vessel indicated that all of the carbon was needed for nicotine entrapment, i.e., a low level of nicotine was present at the outlet of the adsorber. About 97% of nicotine in the tobacco was removed. Run details were:

| | |
|---|---|
| Wt. Tobacco | = 5.5 Kg dwb |
| Wt. Carbon | = 22 Kg |
| Catbon/Tobacco Ratio | = 4/1 |
| $CO_2$ Flow | = 1.1 m³/hr |
| $^MCO_2/^MTobacco$ | = 150 |

EXAMPLE 2

Batch Extraction/Semicontinuous Entrapment

Semicontinuous nicotine entrapment was done, as follows.

American blend tobacco, 5.5 Kg dwb, was moistened to 25% OV via water spray in a rotary cylinder. The moistened tobacco was loaded into an extractor vessel. 11 Kg of activated carbon was loaded into each of two entrapment (adsorber) vessels. The system was pressurized to 260 bar and 70° C. with $CO_2$. $CO_2$ flow was maintained from tobacco to one entrapment vessel for 30 minutes and then rerouted to the second entrapment vessel for another 30 minutes. The total extraction time was 1.0 hr. At the end of the extraction, $CO_2$ was vented, and carbon in Adsorber 1 was replaced with fresh activated carbon. A fresh batch of tobacco was loaded into the extractor, but the carbon was kept in Adsorber 2 in order to reuse it. Supercritical $CO_2$ at 260 bar and 70° C. was cycled through the fresh batch of tobacco and Adsorber 2 for 30 minutes and then through Adsorber 1 for an additional 30 minutes. This simulation of continuous entrapment was continued for six batches of fresh tobacco. Nicotine extraction level of 96.5% or better was achieved for each batch of tobacco.

Run details were:

| | | |
|---|---|---|
| Wt. Tobacco | = | 5.5 Kg dwb |
| Wt. Carbon | = | 22 Kg total, 11 Kg per vessel |
| Ratio Carbon/Tobacco | = | 2/1 (effective) |
| $CO_2$ Flow | = | 1.1 m³/hr |
| $^MCO_2/^MTobacco$ | = | 150 |

| | Tobacco | Extraction Time (Min.) | | | Nicotine Removal |
|---|---|---|---|---|---|
| Run | Wt., Kg. dwb | Ads 1 | Ads 2 | Total | % |
| 1 | 5.5 | 30 | 30 | 60 | 97.2 |
| 2 | 5.5 | 30 | 30 | 60 | 96.5 |
| 3 | 5.5 | 30 | 30 | 60 | 97.0 |
| 4 | 5.5 | 30 | 30 | 60 | 97.7 |
| 5 | 5.5 | 30 | 30 | 60 | 97.0 |
| 6 | 5.5 | 30 | 30 | 60 | 97.2 |

Note: Carbon in second adsorber was reused in the next batch as the first adsorber.

EXAMPLE 3

Semicontinuous Extraction/Semicontinuous Entrapment

The following example is illustrative.

Eight pressure vessels are arranged for series extraction as shown in FIG. 2. The extraction vessels (10 through 14) are large enough to hold 4,845 lbs. of tobacco each at 25% OV (i.e., 366 cu.ft. of tobacco). The entrapment vessels (20 through 22) are large enough to hold 21,870 lbs. of activated carbon (i.e., 875 cu.ft. of carbon volume).

Dry carbon (8,748 lbs.) is loaded into each entrapment vessel (20, 21, 22). A blend of full flavor American tobacco is moistened from about 12% OV to about 25% OV by direct spray of deionized water in a rotating cylinder. About 4,845 lbs. of premoistened tobacco (i.e., 3,634 lbs. dwb) is loaded into each extraction vessel (10, 11, 12, 13, 14).

Start-Up

A $CO_2$ fill pump is used to pressurize vessels 10 and 20. Carbon dioxide is circulated through the flow system at the rate of 611,000 lbs/hr. After extraction conditions are reached, i.e., 260 atmospheres, 70° C., the circulation of $CO_2$ is continued through vessels 10 and 20 for one hour. Vessels 11 and 21 are pressurized with $CO_2$ during this first hour.

In the second hour of extraction, the flow of $CO_2$ is directed through vessels 10, 11, 20 and 21 as shown in FIG. 2. Vessel 12 is pressurized with $CO_2$ during this second hour.

In the third hour of operation, extraction vessel 10 is removed from and vessel 12 is added to the flow system. The flow of $CO_2$ is directed through vessels 11, 12, 20 and 21. Vessel 22 is pressurized with $CO_2$ during this third hour, and turn-around of vessel 10 is begun. During the turn-around phase, the $CO_2$ in extraction vessel 10 is vented and the extracted tobacco is unloaded. Vessel 10 is again filled with tobacco then filled with presurized $CO_2$ and is ready to be returned to the extraction loop. Three hours are available for the turn-around phase for an extraction vessel.

In the fourth hour of operation, vessel 13 is added to and vessel 11 is removed from the extraction loop. Entrapment vessel 20 is removed from and vessel 22 is added to the flow system. The flow of $CO_2$ is directed through vessels 12, 13, 21 and 22. During the turn-around phase, the $CO_2$ in entrapment vessel 20 is vented and the spent carbon is unloaded. Vessel 20 is again filled with carbon then filled with pressurized $CO_2$ and is ready to be returned to the extraction loop. Three hours are available for the turn-around phase for an entrapment vessel.

Steady state conditions are reached in six hours. Vessel 10 is returned to the extraction loop in the 6th hour of operation (Table 4). Extraction vessels 11, 12, 13 and 14 are each similarly subjected to the turn-around phase and then returned to the extraction loop.

Continuous Operation

As shown in FIG. 2 and Table 4, one batch (4,845 lbs.) of extracted tobacco is produced every hour. The nicotine content in the tobacco is reduced 97%, from 1.85% nicotine (dwb) to 0.05% nicotine (dwb). The total extraction time is two hours. The solvent to tobacco ratio is 84 parts of $CO_2$ to one part of tobacco (dwb). This solvent to tobacco ratio is significantly lower than the 150 parts of $CO_2$ to one part of tobacco (dwb) required in a batch system.

TABLE 4

|  | Time (Hr.) | $CO_2$ Flow Arrangement (1) | | Vessels in Turn-around Phase (2) |
| --- | --- | --- | --- | --- |
|  |  | Extraction Vessels | Extrapment Vessels |  |
| Start-up: | 1 | 10 | 20 |  |
|  | 2 | 10,11 | 20,21 |  |
|  | 3 | 11,12 | 20,21 | 10 |
|  | 4 | 12,13 | 21,22 | 10,11,20 |
|  | 5 | 13,14 | 21,22 | 10,11,12,20 |
|  | 6 | 14,10 | 21,22 | 11,12,13,20 |
| Continuous | 7 | 10,11 | 22,20 | 12,13,14,21 |
| Steady State | 8 | 11,12 | 22,20 | 13,14,10,21 |
| Operation: | 9 | 12,13 | 22,20 | 14,10,11,21 |
|  | 10 | 13,14 | 20,21 | 10,11,12,22 |
|  | 11 | 14,10 | 20,21 | 11,12,13,22 |
|  | 12 | 10,11 | 20,21 | 12,13,14,22 |
|  | 13 | 11,12 | 21,22 | 13,14,10,20 |
|  | 14 | 12,13 | 21,22 | 14,10,11,20 |
|  | 15 |  | Continuous Operation |  |

Note:
[1]$CO_2$ flow maintained at 305,000 lb/hr through vessels indicated.
[2]Turn-around time is 3 hours. Turn-around time (TAT) includes the following steps:
Vent $CO_2$
Unload extracted tobacco or spent carbon
Load fresh tobacco or activated carbon
Pressurize $CO_2$ to extraction conditions (260 atmospheres, 70° C.)

As shown in Table 5, it is found that the continuous operation increases the concentration of nicotine in the $CO_2$ solvent without significantly increasing the concentration of other tobacco soluble materials (considered to be important for product quality) in the $CO_2$ solvent.

TABLE 5

|  | Batch Operation | Continuous Operation |
| --- | --- | --- |
| % Nicotine in Tobacco (dwb) |  |  |
| Unextracted | 1.85 | 1.85 |
| Extracted | 0.05 | 0.05 |
| Solvent/Tobacco Ratio (dwb) | 150 | 84 |
| Solubles in $CO_2$ (ppm) |  |  |
| Nicotine | 120 | 214 |
| Other Tobacco Solubles | 120–240 | 120–240 |
| % Solubles Removed from Tobacco (dwb) |  |  |
| Nicotine | 1.8 | 1.8 |
| Other Solubles | 1.8–3.6 | 1.0–2.0 |

Expert evaluation shows that cigarettes made from extracted tobacco, where the solvent to tobacco ratio is low, are of higher subjective quality than cigarettes made from extracted tobacco where the solvent to tobacco ratio is high.

We claim:

1. A method for the extraction of nicotine from tobacco which comprises:
   (a) feeding an essentially nicotine-free solvent to a first end of an extraction flow system containing tobacco and withdrawing a nicotine-rich solvent from a second end of the extraction flow system, wherein said solvent is in the supercritical state;
   (b) periodically discharging a portion of extracted tobacco from the first end of the extraction flow system; and
   (c) charging a portion of unextracted tobacco to the second end of the extraction flow system.

2. The method according to claim 1 wherein the moisture content of the tobacco is up to about 30% by weight.

3. The method according to claim 1 wherein the extraction solvent is selected from the group consisting of carbon dioxide, argon, $SF_6$, $N_2O$, a lower hydrocarbon and a lower halogenated hydrocarbon.

4. The method according to claim 3 wherein the extraction solvent is carbon dioxide.

5. The method according to claim 1 wherein the extraction process is carried out in a plurality of extraction vessels connected in series.

6. The method according to claim 5 wherein two or more extraction vessels connected in parallel are used in place of one or more of the serially-connected vessels.

7. The method of claim 1 wherein the solvent contains one or more additional solvents, co-solvents or additives.

8. A method of separating nicotine from a solvent which comprises:
   (a) feeding a nicotine-containing solvent to a first end of an entrapment flow system containing a nicotine entrapment material and withdrawing an essentially nicotine-free solvent from a second end of the entrapment flow system;
   (b) periodically discharging a portion of spent entrapment material from the first end of the entrapment flow system; and
   (c) charging a portion of fresh entrapment material to the second end of the entrapment flow system.

9. The method according to claim 8 wherein the solvent is in the supercritical state.

10. The method according to claim 8 wherein the solvent is in the liquid state.

11. The method according to claim 8 wherein the extraction solvent is selected from the group consisting of carbon dioxide, argon, $SF_6$, $N_2O$, a lower hydrocarbon and a lower halogenated hydrocarbon.

12. The method according to claim 11 wherein the extraction solvent is carbon dioxide.

13. The method according to claim 8 wherein the entrapment material is an adsorbent selected from the group consisting of carbon, silicon, alumina, magnesium silicate and ion exchange resins.

14. The method according to claim 8 wherein the entrapment material is an absorbent selected from the group consisting of water, acid, aqueous acid and aqueous salt solutions.

15. The method according to claim 14 wherein the entrapment material is an aqueous solution containing an absorbent selected from the group consisting of sulfuric acid, phosphoric acid, nitric acid, tartaric acid, citric acid, malic acid, lactic acid, malonic acid, succinic acid, acetic acid, glutamic acid and monopotassium citrate.

16. The method according to claim 15 wherein the absorbent is selected from the group consisting of citric acid and monopotassium citrate.

17. The method according to claim 8 wherein the entrapment material is selected from the group consisting of tobacco, tobacco stems, tobacco plant products which have been treated with an acid, and cocoa shells.

18. The method according to claim 17 wherein the entrapment material is pretreated with an absorbent selected from the group consisting of sulfuric acid, phosphoric acid, nitric acid, tartaric acid, citric acid, malic acid, lactic acid, malonic acid, succinic acid, acetic acid, glutamic acid and monopotassium citrate.

19. The method according to claim 18 wherein the absorbent is selected from the group consisting of citric acid and monopotassium citrate.

20. The method according to claim 19 wherein the entrapment material is tobacco stems.

21. The method according to claim 8 wherein the entrapment process is carried out in a plurality of entrapment vessels connected in series.

22. The method according to claim 21 wherein two or more entrapment vessels connected in parallel are used in place of one or more of each of the serially-connected vessels.

23. The method of claim 8 wherein the solvent contains one or more additional solvents, co-solvents or additives.

24. A method for the extraction of nicotine from tobacco which comprises:
   (a) feeding an essentially nicotine-free solvent to a first end of an extraction flow system containing tobacco and withdrawing a nicotine-containing solvent from a second end of the extraction flow system;
   (b) periodically discharging a portion of extracted tobacco from the first end of the extraction flow system;
   (c) charging a portion of unextracted tobacco to the second end of the extraction flow system;
   (d) feeding a nicotine-containing solvent to the first end of an entrapment flow system containing a nicotine entrapment material and withdrawing an essentially nicotine-free solvent from the second end of the entrapment flow system;
   (e) periodically discharging a portion of spent entrapment material from the first end of the entrapment flow system; and
   (f) charging a portion of fresh entrapment material to the second end of the entrapment flow system.

25. The method according to claim 24 wherein the moisture content of the tobacco is up to about 30% by weight.

26. The method according to claim 24 wherein the solvent is in the supercritical state.

27. The method according to claim 24 wherein the solvent is in the liquid state.

28. The method according to claim 24 wherein the solvent is selected from the group consisting of carbon dioxide, argon, $SF_6$, $N_2O$, a lower hydrocarbon and a lower halogenated hydrocarbon.

29. The method according to claim 28 wherein the solvent is carbon dioxide.

30. The method according to claim 24 wherein the entrapment material is selected from the group consisting of carbon, silicon, alumina, magnesium silicate and ion exchange resins.

31. The method according to claim 24 wherein the entrapment material is selected from the group consisting of water, acid, aqueous acid and aqueous salt solutions.

32. The method according to claim 31 wherein the entrapment material is an aqueous solution containing an absorbent selected from the group consisting of sulfuric acid, phosphoric acid, nitric acid, tartaric acid, citric acid, malic acid, lactic acid, malonic acid, succinic acid, acetic acid, glutamic acid and monopotassium citrate.

33. The method according to claim 32 wherein the absorbent is selected from the group consisting of citric acid and monopotassium citrate.

34. The method according to claim 24 wherein the extraction process is carried out in a plurality of extraction vessels connected in series.

35. The method according to claim 34 wherein two or more extraction vessels connected in parallel are used in place of one or more of each of the serially-connected vessels.

36. The method according to claim 24 wherein the entrapment process is carried out in a plurality of entrapment vessels connected in series.

37. The method according to claim 36 wherein two or more entrapment vessels connected in parallel are used in place of one or more of each of the serially-connected vessels.

38. The method of claim 24 wherein the solvent contains one or more additional solvents, co-solvents or additives.

39. The method according to claim 24 wherein the entrapment material is selected from the group consisting of tobacco, tobacco stems, tobacco plant products which have been treated with an acid, and cocoa shells.

40. The method according to claim 39 wherein the entrapment material is pretreated with an absorbent selected from the group consisting of sulfuric acid, phosphoric acid, nitric acid, tartaric acid, citric acid, malic acid, lactic acid, malonic acid, succinic acid, acetic acid, glutamic acid and monopotassium citrate.

41. The method according to claim 40 wherein the absorbent is selected from the group consisting of citric acid and monopotassium citrate.

42. The method according to claim 41 wherein the entrapment material is tobacco stems.

43. An apparatus for the extraction of nicotine from a solvent comprising a plurality of entrapment vessels containing entrapment material, said entrapment vessels connected in series to form an entrapment flow system having a first end and a second end such that nicotine-rich solvent enters an entrapment vessel at said first end of the entrapment flow system and exits as essentially nicotine-free solvent from an entrapment vessel at said second end of the entrapment flow system, the entrapment flow system further comprises one or more entrapment vessels, comprising nicotine-free entrapment material which periodically may be connected to said second end of the flow system to replace one or more spent entrapment vessels, containing nicotine-rich entrapment material, removed from said first end of the entrapment flow system.

44. The apparatus according to claim 43 wherein two or more entrapment vessels connected in parallel are used in place of one or more of each of the serially-connected vessels.

45. The apparatus according to claim 43 wherein the extraction solvent is in the liquid state.

46. The apparatus according to claim 43 wherein the extraction solvent is in the supercritical state.

47. The apparatus of claim 43 wherein the solvent is selected from the group consisting of carbon dioxide, argon, $SF_6$, $N_2O$, a lower hydrocarbon and a lower halogenated hydrocarbon.

48. The apparatus according to claim 47 wherein the extraction solvent is carbon dioxide.

49. The apparatus of claim 43 wherein the solvent contains one or more additional solvents, co-solvents or additives.

50. The apparatus according to claim 43 wherein the entrapment material is selected from the group consisting of carbon, silicon, alumina, magnesium silicate and ion exchange resins.

51. The apparatus according to claim 43 wherein the entrapment material is selected from the group consisting of water, acid, aqueous acid and aqueous salt solutions.

52. The apparatus according to claim 43 wherein the entrapment material is an aqueous solution containing an absorbent selected from the group consisting of sulfuric acid, phosphoric acid, nitric acid tartaric acid, citric acid, malic acid, lactic acid, malonic acid, succinic acid, acetic acid, glutamic acid and monopotassium citrate.

53. The apparatus according to claim 52 wherein the absorbent is selected from the group consisting of citric acid and monopotassium citrate.

54. The apparatus according to claim 43 wherein the entrapment material is selected from the group consisting of tobacco, tobacco stems, tobacco plant products which have been treated with an acid, and cocoa shells.

55. The apparatus according to claim 54 wherein the entrapment material is pretreated with an absorbent selected from the group consisting of sulfuric acid, phosphoric acid, nitric acid, tartaric acid, citric acid, malic acid, lactic acid, malonic acid, succinic acid, acetic acid, glutamic acid and monopotassium citrate.

56. The apparatus according to claim 55 wherein the absorbent is selected from the group consisting of citric acid and monopotassium citrate.

57. The apparatus according to claim 56 wherein the entrapment material is tobacco stems.

58. An apparatus for the removal of nicotine from tobacco with a solvent and the removal of nicotine from the solvent comprising:

(a) a plurality of tobacco extraction vessels connected in series to form an extraction flow system such that essentially nicotine-free solvent enters the first end of an extraction flow system containing tobacco and exits as a nicotine-rich solvent from a second end of the extraction flow system; and (b) a plurality of nicotine entrapment vessels containing entrapment material said entrapment vessels connected in series to form an entrapment flow system having a first end and a second end such that the nicotine-rich solvent exiting the extraction flow system enters an entrapment vessel at said first end of the entrapment flow system and exits as essentially nicotine-free solvent from an entrapment vessel at said second end of the entrapment flow system, the entrapment flow system further comprises one or more entrapment vessels, comprising nicotine-free entrapment material which periodically may be connected to said second end of the flow system to replace one or more spent entrapment vessels, containing nicotine-rich entrapment material, removed from said first end of the entrapment flow system.

59. The apparatus according to claim 58 wherein two or more extraction vessels are connected in parallel in place of one or more of each of the serially-connected extraction vessels.

60. The apparatus according to claim 58 wherein two or more entrapment vessels are connected in parallel in place of one or more of each of the serially-connected entrapment vessels.

61. The apparatus according to claim 58 wherein the extraction solvent is in the liquid state.

62. The apparatus according to claim 58 wherein the extraction solvent is in the supercritical state.

63. The apparatus of claim 58 wherein the solvent is selected from the group consisting of carbon dioxide, argon, $SF_6$, $N_2O$, a lower hydrocarbon and a lower halogenated hydrocarbon.

64. The apparatus according to claim 63 wherein the extraction solvent is carbon dioxide.

65. The apparatus of claim 58 wherein the solvent contains one or more additional solvents, co-solvents or additives.

66. The apparatus according to claim 58 wherein the entrapment material is selected from the group consisting of carbon, silicon, alumina, magnesium silicate and ion exchange resins.

67. The apparatus according to claim 58 wherein the entrapment material is selected from the group consisting of water, acid, aqueous acid and aqueous salt solutions.

68. The apparatus according to claim 58 wherein the entrapment material is an aqueous solution containing an absorbent selected from the group consisting of sulfuric acid, phosphoric acid, nitric acid, tartaric acid, citric acid, malic acid, lactic acid, malonic acid, succinic acid, acetic acid, glutamic acid and monopotassium citrate.

69. The apparatus according to claim 68 wherein the absorbent is selected from the group consisting of citric acid and monopotassium citrate.

70. The apparatus according to claim 58 wherein the entrapment material is selected from the group consisting of tobacco, tobacco stems, tobacco plant products which have been treated with an acid, and cocoa shells.

71. The apparatus according to claim 70 wherein the entrapment material is pretreated with an absorbent selected from the group consisting of sulfuric acid, phosphoric acid, nitric acid, tartaric acid, citric acid, malic acid, lactic acid, malonic acid, succinic acid, acetic acid, glutamic acid and monopotassium citrate.

72. The apparatus according to claim 71 wherein the absorbent is selected from the group consisting of citric acid and monopotassium citrate.

73. The apparatus according to claim 72 wherein the entrapment material is tobacco stems.

* * * * *